WILLIAM FOY HERSCHEDE
WILLIAM N. WOODRUFF
CHARLES A. TOCE

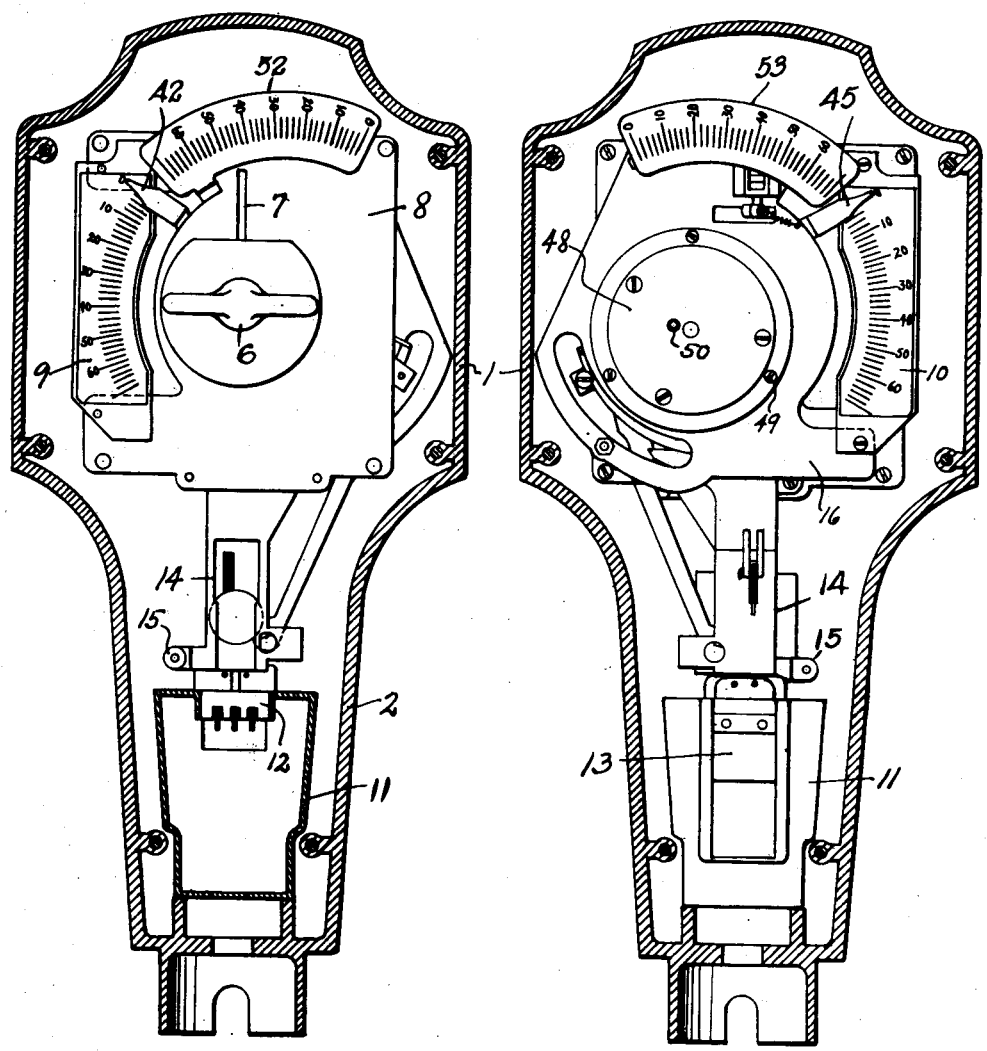

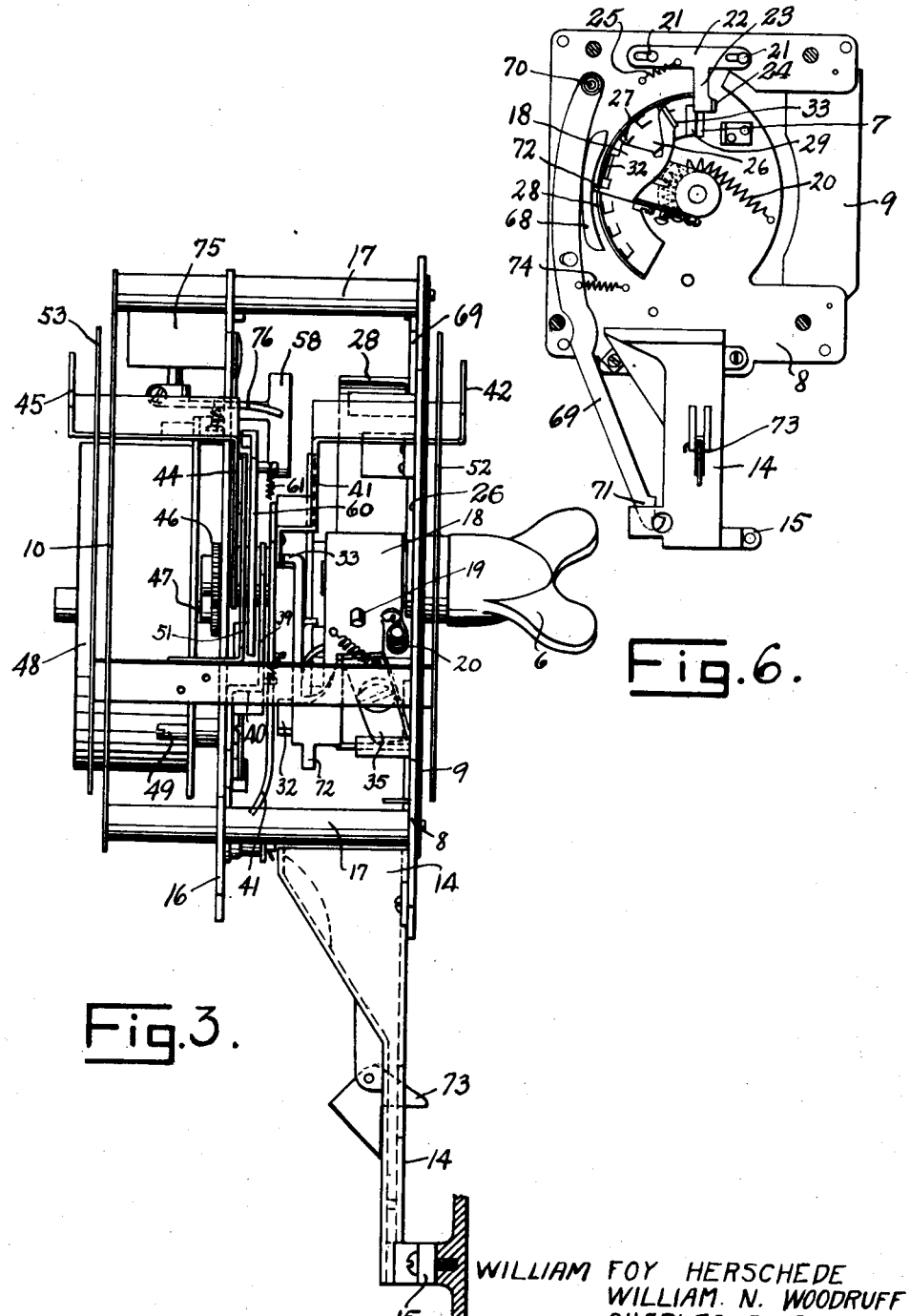

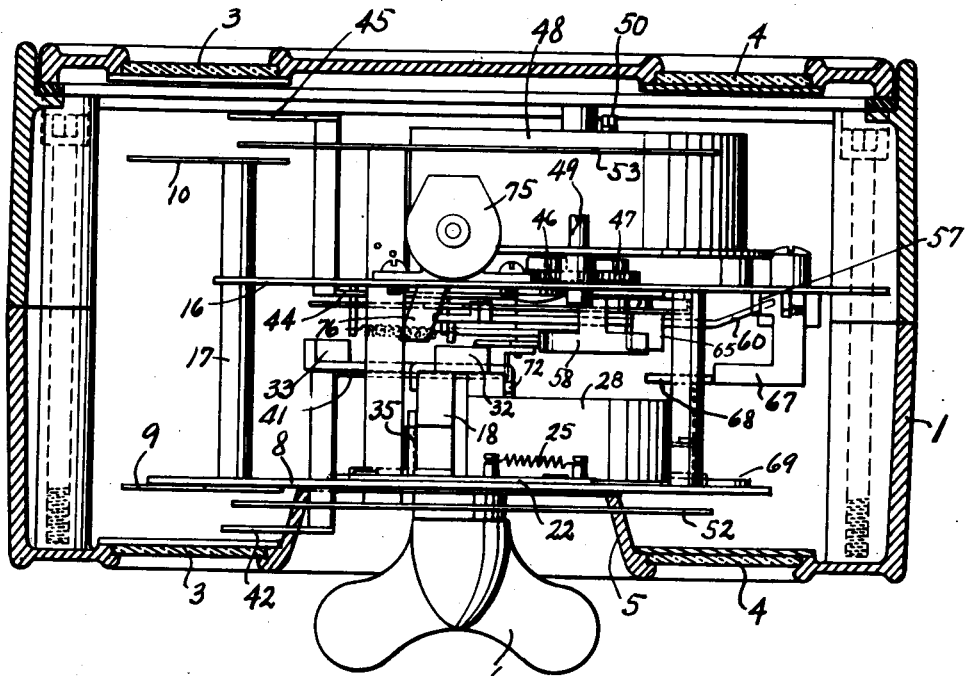

Patented June 13, 1939

2,162,191

UNITED STATES PATENT OFFICE 2,162,191

METER

William N. Woodruff and Charles A. Toce, Houston, Tex., and William Foy Herschede, Cincinnati, Ohio, assignors, by mesne assignments, to Vehicular Parking, Ltd., Washington, D. C., a corporation of Delaware Application November 24, 1936, Serial No. 112,484

11 Claims. (Cl. 161—15)

This application relates in general to time measuring apparatus, and more particularly to that type of apparatus designed for measuring the time which a vehicle remains parked in a given location.

Great difficulty has been encountered from time to time in regulating the parking on the city streets, and in other locations, and various means have been devised for regulating this practice in such a manner that the public would derive the greatest benefit from the parking space available, and would not unduly hamper traffic. One means of controlling the parking of vehicles has been to provide a meter or time keeper which will indicate to a passer-by upon a mere casual inspection the length of time which has elapsed since a vehicle was parked in the space controlled by said device.

It is an object of this invention to provide a device of this general character which will eliminate the difficulties encountered by and inherent in previous means for this purpose.

It is a more specific object of this invention to provide a device which will indicate at a glance whether or not a given period which has been paid for has expired, and which will show on inspection within certain limits the length of time which has expired beyond the period within which parking is allowed.

It is a further object to provide a device of the character set forth in which when the device is to be reset before the initial period has expired, a signal will be operated to indicate that the time period has expired, and this signal will not be rendered inoperative until the resetting operation is complete.

It is a further object of this invention to provide a device of the character set forth with a signal adapted to indicate that the allowable parking period has expired, and to eliminate the necessity in such a device for a latch or catch mechanism to hold such signal in inoperative position until the time has expired.

One other object of this invention is to provide a device of the character described which will give a readily perceptible visual indication of whether or not the time has expired, and will give this indication at night as well as in daylight.

Another object is to provide a device which will give an accurate indication of the passage of time after the allowed parking period has expired, as well as prior thereto.

Another object is to provide a separate scale upon which overtime parking is indicated, and to provide for the automatic replacement of the regular time scale by such separate scale upon the expiration of the allowed parking period.

Other objects and advantages of this invention will become apparent from the following description taken in connection with the accompanying drawings, it being understood that the embodiment set forth in said description and drawings is by way of illustration and example only, and not by way of limitation. This invention is to be limited only by the prior art and by the terms of the appended claims.

In the drawings:

Fig. 1 is a view partly in vertical cross section showing in front elevation the working parts of a device constructed in accordance with this invention.

Fig. 2 is a similar view showing these parts in rear elevation.

Fig. 3 is a view showing the assembled working parts in side elevation.

Fig. 4 is a view partly in horizontal cross section showing the assembled working parts in top plan.

Fig. 6 is a similar view showing the parts after the resetting operation has begun.

Fig. 10 is a side elevation illustrating the resetting arm to which the resetting handle is connected.

Fig. 11 is a rear elevation of the same structure.

Fig. 12 is an end view of the resetting arm shown in Figs. 10 and 11 with a coin in place therein after the resetting operation has begun.

Fig. 13 is a view partly in vertical cross section illustrating details of the resetting arm.

Figure 7:
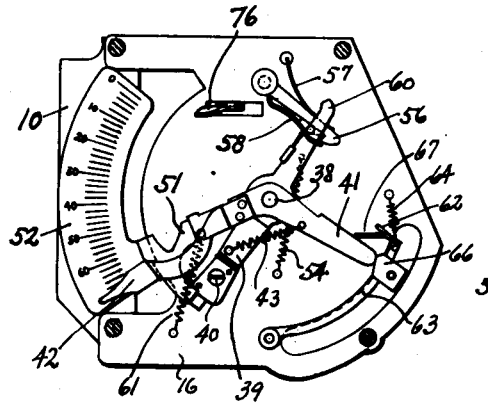
Fig. 7 is a view illustrating the remainder of the resetting and time-indicating parts of the mechanism in the position in which they appear after the device has run down, and prior to the resetting operation.

Referring now more particularly to the drawings, there is illustrated in Figs. 1 and 2 a housing for the device having an upper and somewhat larger portion 1 and a lower relatively narrow portion 2. The upper portion of this housing (see Fig. 4) is provided in its opposite faces with similarly disposed windows 3 through which the time-indicating parts may be viewed, and with display windows 4 which may be utilized for any desired purpose such as for giving instructions for the use of the device.

In the front face of the enlarged upper portion 1 (Fig. 4) there is provided an opening 5 of a size sufficient to receive and permit the passage of the knob or operating handle 6 (see Fig. 1). Just above the operating handle 6 there is formed a slot 7 in the support plate 8 in which the operating handle is journalled. This slot 7 is for the reception of a coin in those instances where the device is employed for the purpose of exacting the payment of a given amount before the resetting mechanism can be actuated.

In alignment with the front window 3 (Fig. 4) the support plate 8 carries a scale 9 graduated in units of time and adapted to provide a means upon which the passage of time is indicated prior to the expiration of the allowed parking period. A similar scale 10 is mounted in an opposed position directly behind the window 3 in the rear wall of the housing, the purpose of this second scale being to permit the reading of the meter from either side thereof.

Within the tapered lower portion 2 of the housing (see Figs. 1 and 2) there is provided space for the coin box 11 adapted to receive the coins dropped into the device, this box having a slot 12 therein through which the coins pass into the box, and a sliding door 13 therein for the removal of the coins from the box. Suitable provision may be made for the sealing of this door, if so desired. The coins are conducted downwardly from the meter proper by means of a coin chute 14 (see also Fig. 3) so positioned that coins will drop therefrom directly into the slot 12 in the coin box. This chute 14 is provided with an ear or similar means 15 by which it may be attached to the inner wall of the housing.

Referring again to the details of the time-indicating structure and resetting mechanism therefor, it will be seen that in addition to the front support plate 8 already referred to, there is a second rear support plate 16, (see Figs. 2, 3 and 4) these plates being joined together by means of posts 17, two of which are extended to form a support for the rear dial or scale 10.

As has already been stated, the handle 6 is journaled in the support plate 8, and rearwardly of the support plate (Figs. 3 and 4) is provided with an operating arm 18 fixedly mounted with respect to the handle 6 so as to rotate therewith. The pin 19 or similar connection is provided for fixedly mounting the arm 18 upon the inner end of the operating shaft carried by the handle 6. The operating shaft and handle, together with the operating arm 18, are normally urged in a counter-clockwise direction, as one faces the meter, by means of a spring 20 (Fig. 3) anchored to the plate 8. The arm 18 is thus normally held in its uppermost vertical position (Fig. 5) against a suitable stop provided therefor. In this position, the slot in the operating arm 18 is held in alignment with the slot 7 in the plate 8 so that a coin inserted through the slot 7 will be passed into the slot in the operating arm 18.

Figure 5:
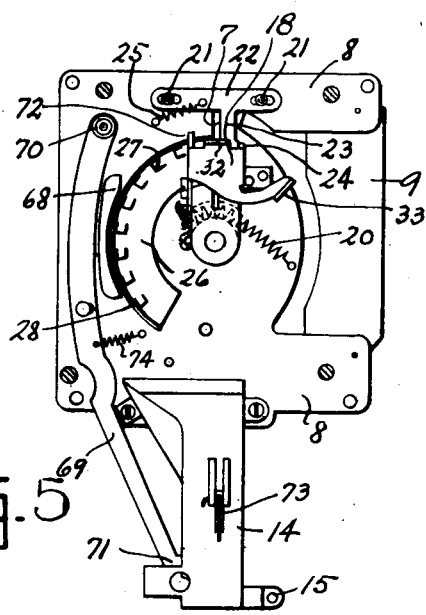
Fig. 5 is a sectional view illustrating the coin-controlled portion of the resetting mechanism as it appeared prior to the resetting operation.

Slidably mounted on pins 21, or similar supports, there is shown in Figs. 5 and 6 a plate 22 having a downwardly extending portion 23 adapted when the resetting arm 18 is moved toward resetting position (see Fig. 6) to partially cover the slot 7 in the plate 8 and prevent the insertion of a coin therethrough. This downwardly extending portion 23 has a lug 24 thereon adapted to be contacted by the arm 18 when said arm is in its uppermost position as shown in Fig. 5 so that the plate 22 will be pushed by the arm 18 against the tension of the spring 25 until the portion 23 uncovers the slot 7.

Mounted on the rear surface of the plate 8 (see Figs. 3, 5 and 6) with the center of rotation of the arm 18 as its center is a segmental track 26 having ratchet teeth 27 formed thereon. Arranged along the outer edge of this track is a retaining shield 28 for a purpose which will be presently described. The track 26 at its leading edge is bevelled as shown at 29 in Figs. 6 and 12, and it will be seen that when a coin is inserted through the slot 7 into the slot in the arm 18, and the arm 18 then rotated, the coin will be caused to ride up the inclined portion 29 of the track 26 and thence to ride along this track until the end of the track is reached. Such a coin is illustrated in Fig. 12 at 30, and it will be seen that when it rides up on the inclined surface 29 it will move the resetting member 31 in an axial direction away from the plate 8. This resetting member 31 has lugs 32 and 33 thereon, the purpose of which will presently appear, and this member is constantly urged toward the plate 8 and the arm 18 by means of springs 34 (Fig. 13). Also, pivotally mounted on one side of the arm 18 (see Figs. 10 and 12) is a pawl 35 pivoted at 36, and having a spring 37 constantly urging the end of said pawl in a direction to engage the ratchet teeth 27. This pawl is normally held out of engagement with such teeth by means of the member 31, (see Fig. 10) thereby permitting free rotation of the handle. When, however the member 31 is moved axially by the insertion of a coin and the rotation of the operating handle to the position shown in Fig. 12, for example, the pawl 35 will be released to engage with the teeth 27 as clearly appears in that figure (see also Fig. 3).

Figure 8:
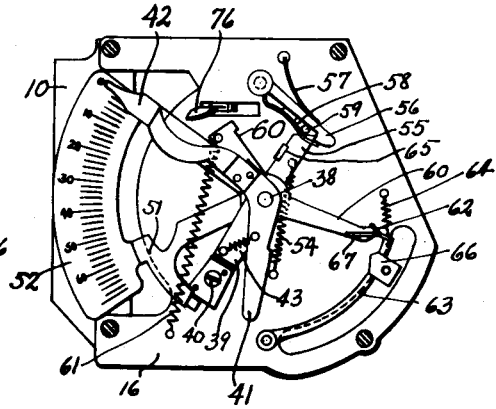
Fig. 8 is a view similar to Fig. 7 showing the various parts in the position in which they appear after the resetting operation, but prior to the return of the resetting handle to its initial position.
Figure 9:
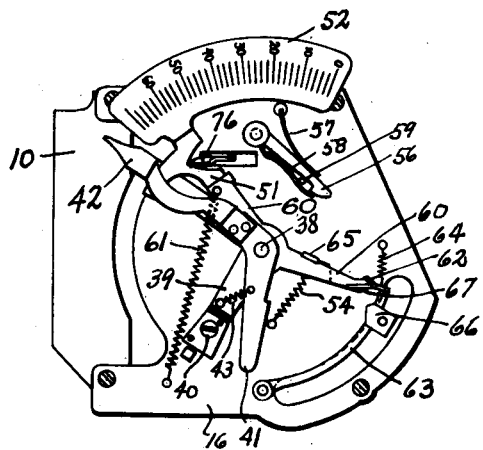
Fig. 9 is a view similar to Figs. 7 and 8 showing the various parts as they appear after the completion of the resetting operation and the return of the resetting handle to its original position.

Journaled in the rear support plate 16 as shown in Figs. 7, 8 and 9 is the main operating shaft 38, a bridge 39 anchored to the plate 16 as shown at 40 (see also Fig. 3) being provided for the purpose of furnishing extra support for the shaft 38. Fixedly mounted on this shaft for rotation therewith is an arm 41 carrying the time-indicating hand 42 on one end thereof in a position to move along and over the scale or dial 9 to indicate the passage of time (Fig. 1). This hand, together with the shaft 38, are normally urged toward the zero position on the dial by means of a spring 43, this spring being of insufficient strength, however, to prevent the movement of the hand over the dial from the zero point to indicate the passage of time. Also fixedly mounted upon the shaft 38 in a position spaced axially from the arm 41 is a second arm 44, (see Figs. 3 and 4) this arm lying closely adjacent the support plate 16, and carrying at its outer end a hand or pointer 45 similar to the pointer 42. It will be seen that since both of these arms and pointers are fixedly mounted on the shaft 38, they will move in unison as the shaft 38 is rotated.

Rearwardly of the plate 16 as shown in Figs. 3 and 4 the shaft 38 is provided with a gear 46 meshing with a second gear 47 which is in turn mounted upon the main shaft of a time-keeping mechanism 48 of any conventional character desired. The mechanism 48 is shown as being secured to the plate 16 by means of bolts 49 or the like, (see also Fig. 2) and is provided with a means 50 for the reception of a key whereby the pointers 42 and 45 may be manipulated for purposes of repair or adjustment. It is contemplated that in the event a spring-operated mechanism is employed, the spring will be given an initial wind to a predetermined degree, and that thereafter the resetting of the pointers 42 and 45 in starting the meter, as more fully appears hereinafter and the consequent rotation in a reverse direction of the shaft 38 will serve to rewind the spring of the clock mechanism and render it unnecessary for this mechanism to be separately wound.

Freely rotatable upon the shaft 38 between the arms 41 and 44 (see Fig. 3) is an arm 51 carrying flags or signalling devices 52 and 53. These flags are so positioned that when the arm 51 is moved in a counter-clockwise direction, as seen in Fig. 7, the flags will move to a position overlying and substantially concealing the dials 9 and 10. It is contemplated that these flags shall be of some distinctive color different from the color of the dials 9 and 10, so that when the flags are covering the dials this will be readily apparent even on a casual inspection. The arm 51 is normally urged in a clockwise direction so as to position the flags 52 adjacent the top of the mechanism as shown in Figs. 1, 2 and 9 and uncover the dials 9 and 10, the force urging this motion of the arm 51 being supplied by the spring 54 which is of sufficient strength to raise the flags 52 and 53.

At its end opposite the flags 52 and 53, the arm 51 is shaped as shown at 55 (see Fig. 8) to cooperate with and be retained by the latch member 56. This latch member is normally urged into engagement with the arm 55 by means of a spring 57, and is provided with a laterally extending cam-shaped part 58 (see also Figs. 3 and 4) for a purpose which will presently appear. The movement of the latch 56 toward the end 55 of the arm 51 is limited by means of a pin 59 shown clearly in Figs. 8 and 9 of the drawings.

In addition to the arm 51 there is a second arm 60 freely rotatable upon the shaft 38 between the arms 41 and 44, this arm being urged in a counter-clockwise direction at all times (see Figs. 7, 8 and 9) by means of a spring 61 which is of considerably greater strength than the spring 54 previously referred to. The arm 60 is so shaped at its end opposite the spring 61 as to be engaged and retained by the latch member 62 mounted on the end of the arm 63 and urged into engagement with the arm 60 by means of a spring 64. This arm 60 is adapted to abut a lug 65 on the portion 55 of the arm 51 and move arm 51 counter-clockwise into its latched position as seen in Figs. 7 and 8 upon release of latch 62, thereby bringing signal flags 52 and 53 into signalling position.

Mounted on the arm 63 which carries the latch 62 is an adjustable cam-shaped lug 66 so positioned that when the shaft 38 has rotated a predetermined distance and the hands 42 and 45 have indicated the passage of a predetermined length of time, the end of the arm 41 opposite the hand 42 (see Fig. 7) will engage the cam element 66 and will cause the latch 62 to release the arm 60 raise arm 51 and drop signal flags 52 and 53 into signalling position as noted above. The latch 62 is provided with an inwardly projecting part 67 for a purpose which will be presently described.

Referring again to Figs. 5 and 6, there is illustrated adjacent the path of the arm 18 as it rotates in the resetting operation, a cam-shaped element 68 mounted on an arm 69 pivotally supported at 70 on the plate 8. At its lower end, this arm is provided with a hook or catch 71 projecting into the coin chute 14 so as to retain within this chute the last coin inserted in the machine. The inward extension 67 on the latch 62 (see Fig. 4) is so positioned as to be in contact with the cam-shaped member 68 or a portion thereof, and when the arm 18 is rotated with a coin in place in the slot thereof, the element 72 of the resetting member 31 will rotate the cam-shaped member 68 and cause the movement of the arm 69 to release the coin being retained in the coin chute. At the same time, this movement of the cam-shaped member 68 will cause a movement of the arm 63 to release the latch 62 from the arm 60, thus permitting counter-clockwise rotation of this arm thereby causing upward movement of arm 51 and a showing of the signals 52 and 53.

While a coin is being retained in the coin chute by the catch or hook 71, such coin is also prevented from being fraudulently moved upwardly and out of the coin chute by means of the element 73 which is clearly illustrated in Fig. 3 of the drawings.

The arm 69 is normally urged to a position in which the catch 71 would retain a coin by means of a spring 74 secured thereto.

A counter 75 (see Figs. 3 and 4), is preferably mounted upon the rear surface of the plate 16, and the operating arm thereof which is shown at 76 extends through an aperture in said plate to be actuated in a manner now to be set forth.

In operation, a person who has parked a vehicle in a space controlled by a device constructed in accordance with this invention such as that just described, will insert a coin of the proper denomination through the slot 7 (Fig. 1) and into the slot in the resetting arm 18 (Fig. 4). He will then rotate the operating handle 6 to the right as he faces the device. As soon as rotation is begun, the plate 22 (Fig. 5) will be moved under the action of spring 25 to the left as illustrated in Fig. 6, so as to partially close the slot 7 and prevent the insertion of another coin until the arm 18 has been returned to its initial position.

The first movement of the arm 18 also causes the coin to ride up on the inclined portion 29 of the track 26 (Figs. 6 and 12), and to thereafter ride along this track, in which position it will maintain the resetting member 31 in the position illustrated in Fig. 12. When this resetting member is in this position, it permits the pawl 35 to engage with the ratchet teeth 27 (Fig. 3) and prevent backward movement of the arm 18. Also, it moves the lugs 32 and 33 and the element 72 in an axial direction so that further rotation of the arm 18 will cause the lug 33 (see Figs. 3 and 4) to engage with the counter lever 76 and actuate the counter 75 which records the number of times the device is actuated.

Further rotation of arm 18 causes the element 72 (see Fig. 6) to strike the cam-shaped member 68 and move the lever 69 to the left as shown in Fig. 5, thus releasing the coin which has been up to this time held in the coin chute, and which was previously inserted in the machine, and simultaneously, if the arm 60 is being held by the latch 62, it will be released therefrom. (This would only occur in the event that the time for which the meter had been previously set had not yet expired and the flags were in their uppermost or non-signalling positions.) Upon release of the arm 60, if these flags were in their uppermost position, the spring 61 would cause counter-clockwise rotation of the arm 60 as shown in Fig. 9, and due to the presence of the lug 65 this arm in rotating would carry with it the arm 51 upon which the flags 52 and 53 are mounted. This is due to the fact that the spring 61 is stronger than the spring 54, the spring 54 being by this action stretched until the end 55 of the arm 51 is engaged by the latch 56 as seen in Fig. 8. (It will be understood that if prior to resetting the mechanism the time allowed for parking has expired, the arm 51 and the flags 52 and 53 together with the arm 60 will already have been rotated in a counter-clockwise direction to the position illustrated in Fig. 7 as appears more fully below.)

Upon further rotation of the arm 18, the lug 32 (see Fig. 3) will engage the lower right hand end of the arm 41 as seen in Fig. 7, and the lug 33 will engage the arm 60 (Fig. 4) so that both of these arms will be rotated in a clockwise direction. This rotation will continue until the hand 42 has been moved upwardly to the zero point on the dial and the arm 60 has engaged the latch 62, as shown in Fig. 8. It will be appreciated that this movement of the arm 60 stretches the spring 61, but that this in no way affects the position of the arm 51 and signals 52 and 53 because the back part 55 of this arm is still held by the latch 56.

At approximately the point where the hand 42 has been moved to the zero point on the dial, the coin in the slot in the arm 18 will move past the end of the track 26 (Fig. 5) thus permitting the member 31 to be returned to its original position by the spring 34, and permitting the coin, no longer retained by the tension of the spring 34 or by the shield 27, to drop into the coin chute 14.

After the coin has fallen into the coin chute the operating handle 6 is released, and the spring 20 will return the operating handle and the arm 18 to their original positions. In moving to the original position, however, the lug 32 (Figs. 3 and 4) will contact the cam-shaped member 58 on the latch 56 (see also Fig. 8), and will release this latch from the arm 55 so as to permit the spring 54 to rotate this arm in a clockwise direction as seen in Fig. 9 to move the flags 52 and 53 to their uppermost position uncovering the dials 9 and 10. It will be seen, therefore, that signal flags 52 and 53 are exposed throughout the resetting operation, coming into signalling position in starting the resetting operation and going out of signalling position upon completing the resetting.

After the device has been reset as just described, the clock-work mechanism 48 will operate to cause a gradual movement of the pointers 42 and 45 downwardly over their respective dials until the time allowed for parking has expired. When this time has expired, the end of the arm 41 which is opposite the pointer 42 will strike against the adjustable lug 66 on the arm 63 (Fig. 9), thus disengaging the latch 62 from the arm 60. When this occurs, the spring 61, being stronger than the spring 54, will cause the rotation of the arm 60 as well as the rotation of the arm 51 in a counterclockwise direction, bringing the flags 52 and 53 to a position overlying the dials 9 and 10, as seen in Fig. 7. The clock mechanism will, however, continue to run and indicate overtime operation until the pointer 42 has reached the extremity of its travel. Since the flags 52 and 53 have dials provided thereon, it will readily be seen that the pointers 42 and 45 will continue to register the passage of time, even after the time permitted for parking has expired.

It is contemplated by this invention not only that the time-indicating means including the flags 52 and 53 shall be of a distinctive color and different from the color of the time-indicating means including the dials 9 and 10 so that overparking may be easily detected, but it is also contemplated that one of the sets of dials, preferably the dials 9 and 10, shall be painted with a luminous paint, or otherwise rendered visible in the darkness, thus permitting the use of these meters after nightfall. It will readily be seen that if for instance the dials 9 and 10 are painted with a luminous paint, this would by the visibility or invisibility of the radiations therefrom indicate immediately whether or not the time allowed for parking had expired.

It will be seen from the foregoing that a device has been provided which is capable of carrying out all the objects and advantages sought by this invention.

Having described our invention, we claim:

1. In a timing apparatus, means for indicating the passage of time comprising a dial and a hand movable over said dial, means for setting said hand at a predetermined starting point with respect to said dial, and a signalling means connected to said first means and operable upon the expiration of a predetermined period of time following said setting operation, said signalling means including a shield adapted to move to a position between said hand and said dial.

2. In a timing apparatus, means for indicating the passage of time comprising a dial and a hand movable over said dial, means for setting said hand at a predetermined starting point with respect to said dial, and a signalling means connected to said first means and operable upon the expiration of a predetermined period of time following said setting operation, said signalling means including a shield adapted to move to a position between said hand and said dial and having indicia thereon for indicating overtime when said shield has been moved to such position.

3. In a timing apparatus, means for indicating the passage of time, means for setting said first means at a predetermined starting point, signalling means for signalling the expiration of a predetermined period of time following said setting operation, spring means constantly urging said signalling means away from signalling position, and spring means of superior strength controlled by said first means for overpowering said last mentioned spring means to move said signalling means to signalling position when said predetermined time has expired.

4. In a timing apparatus, means including a graduated scale for indicating the passage of time, means for setting said first means at a predetermined starting point, signalling means adapted to cause disappearance of the scale of said time-indicating means for signalling the expiration of a predetermined period of time following said setting operation, spring means for normally urging said signalling means away from signalling position, and spring means of superior strength controlled by said first means for overpowering said last mentioned spring means to move said signalling means toward signalling position when said predetermined time has expired.

5. In a timing apparatus, means for indicating the passage of time, means for causing said first means to start the indication of a predetermined period of time, signalling means movable to signal the expiration of said predetermined period of time, normally restrained means for moving said signalling means toward signalling position, means for releasing said last mentioned means for operation upon the expiration of said predetermined period of time, means for releasing said same means upon the actuation of said second mentioned means, and means for moving said signalling means away from signalling position when said first means begins indicating time.

6. In a timing apparatus, means for indicating the passage of time, means movable to cause said first means to start the indication of a predetermined period of time, means to signal the expiration of said predetermined period of time, normally restrained means for rendering visible said signalling means, means for releasing said last mentioned means for operation upon the expiration of said predetermined period of time, means for releasing said same means upon initial movement of said second mentioned means, and means for rendering invisible said signalling means upon final movement of said second mentioned means.

7. In a timing apparatus, in combination, a graduated scale, an indicating hand, timing mechanism moving said hand along said scale in accordance with the passage of time, a movable second graduated scale, and means associated with said timing mechanism for bringing said second scale into operative association with respect to said indicating hand after the lapse of a predetermined period of time as measured on said first scale, thereby permitting indication of overtime operation of said apparatus.

8. In a timing apparatus, in combination, a time-indicating means, a second time-indicating means, means for rendering indicating said first means and rendering non-indicating said second means in initiating operation of said apparatus, and means for rendering indicating said second means and rendering non-indicating said first means upon expiration of a predetermined period of operation of said first means, one of said first or second means including signal means which show during a setting of the apparatus from the indicating position of said second means to the initial indicating position of said first means.

9. In a parking meter, in combination, means including timing mechanism having mechanical energy storage means for indicating the passage of time, means including a freely movable handle for setting said time-indicating means at an initial timing position and rewinding said timing mechanism, token-actuated means for controlling operation of said setting and rewinding means by said handle means, normally obscured signal means for showing an inoperative condition of the timing mechanism during its resetting and rewinding, and means operated by said handle means only during its engagement with the setting and rewinding means for exposing said signal means substantially throughout the resetting and rewinding of said time-indicating means, whereby the inoperative condition of the apparatus is readily perceived in the event the resetting and rewinding operation is arrested before completion.

10. In a parking meter, in combination, a graduated scale, an indicating hand, timing mechanism having mechanical energy storage means moving said hand along said scale in accordance with the passage of time, means including a freely rotatable handle for setting said hand at an initial indicating position on said scale and rewinding said timing mechanism, token-actuated means for controlling operation of said setting and rewinding means by said handle means, signal means for showing an inoperative condition of the meter during the setting of said hand, and means operated by said handle means only during engagement with said setting and winding means for exposing said signal means substantially throughout the resetting of said indicating hand.

11. In a parking meter, in combination, means including a hand and scale for indicating the passage of an allotted period of time, means including one of said hand or scale for denoting overtime, timing mechanism having mechanical energy storage means for successively actuating said first and second means, freely movable manual means, means for resetting said hand and scale to an initial time-indicating position and rewinding said timing mechanism, token-actuated means for controlling operation of said resetting and rewinding means by said manual means, signal means for showing an inoperative condition of the meter during actuation of said resetting means, and means operated by said manual means only during engagement with said resetting and rewinding means for exposing said signal means substantially throughout the resetting of said time-indicating means, whether from a position of allotted time or from a position of overtime.

WILLIAM N. WOODRUFF.
CHARLES A. TOCE.
W. FOY HERSCHEDE.

DISCLAIMER 2,162,191.—*William N. Woodruff* and *Charles A. Toce*, Houston, Tex., and *William Foy Herschede*, Cincinnati, Ohio. METER. Patent dated June 13, 1939. Disclaimer filed October 4, 1940, by the inventors and the assignee, *Vehicular Parking, Ltd.*

Hereby enter this disclaimer to claim 1 in said specification.
[*Official Gazette October 29, 1940.*]